(No Model.)

8 Sheets—Sheet 1.

E. A. LEIGH.
CARDING MACHINE.

No. 335,761. Patented Feb. 9, 1886.

Witnesses.
H. E. Lodge.
A. F. Hayden.

Inventor.
Evan A. Leigh.
F. Curtis. Atty.

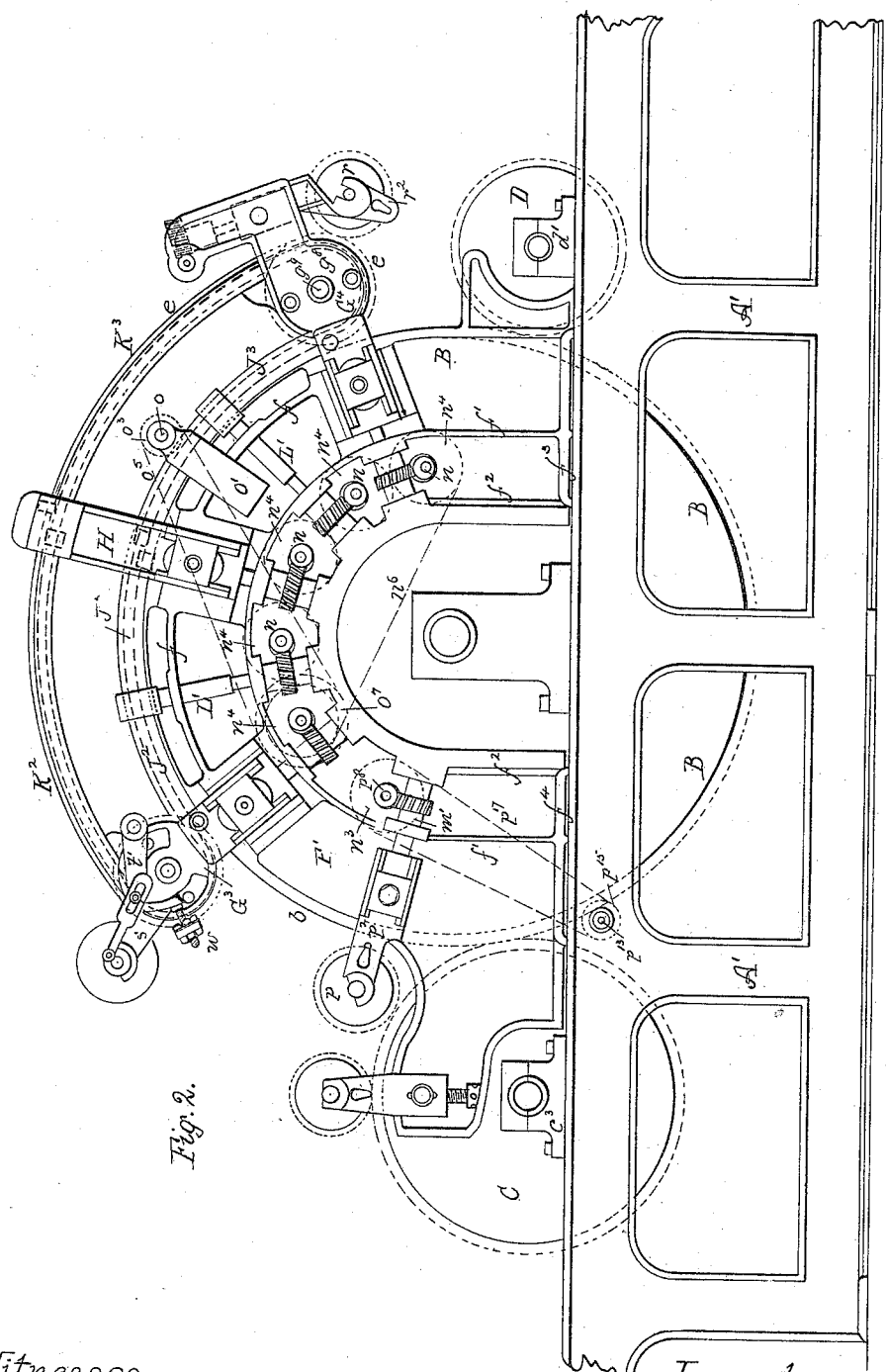

(No Model.)  8 Sheets—Sheet 3.
E. A. LEIGH.
CARDING MACHINE.
No. 335,761.  Patented Feb. 9, 1886.
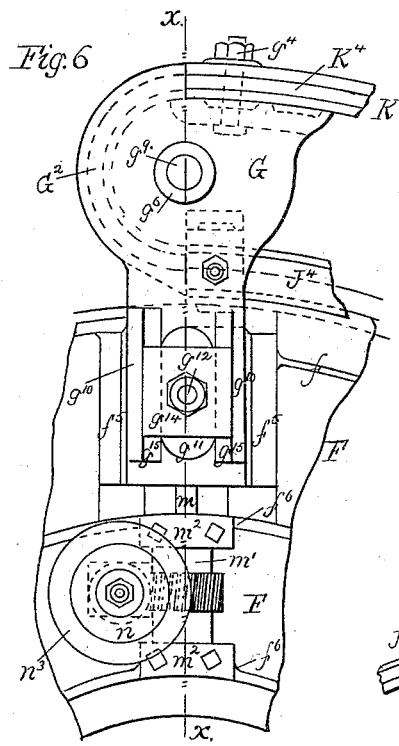
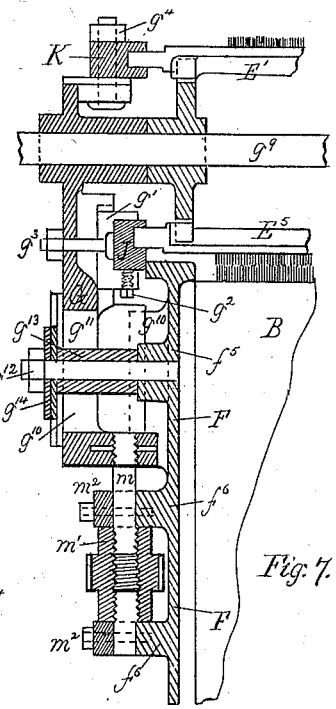
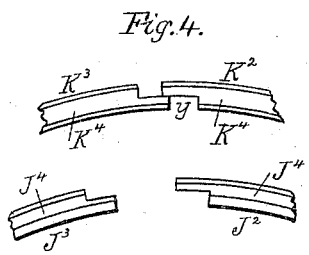
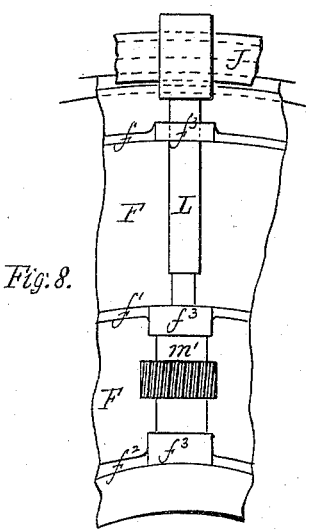
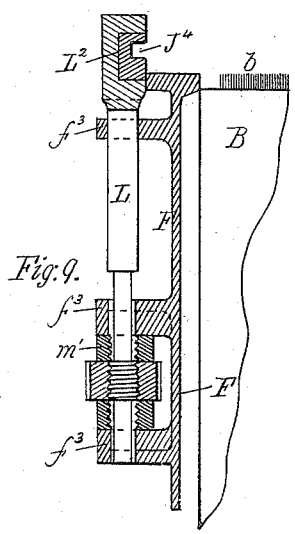
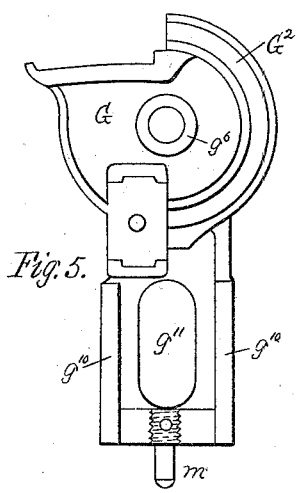
Witnesses.
H. E. Lodge.
A. F. Hayden.
Inventor.
Evan A. Leigh.
F. Curtis, Atty.

(No Model.)　　　　　　　E. A. LEIGH.　　　8 Sheets—Sheet 4.
CARDING MACHINE.

No. 335,761.　　　　　　　　　　Patented Feb. 9, 1886.

Witnesses.
H. E. Lodge.
A. F. Hayden.

Inventor.
Evan A. Leigh.
H. Curtis, Atty.

(No Model.)  8 Sheets—Sheet 6.
E. A. LEIGH.
CARDING MACHINE.
No. 335,761.  Patented Feb. 9, 1886.
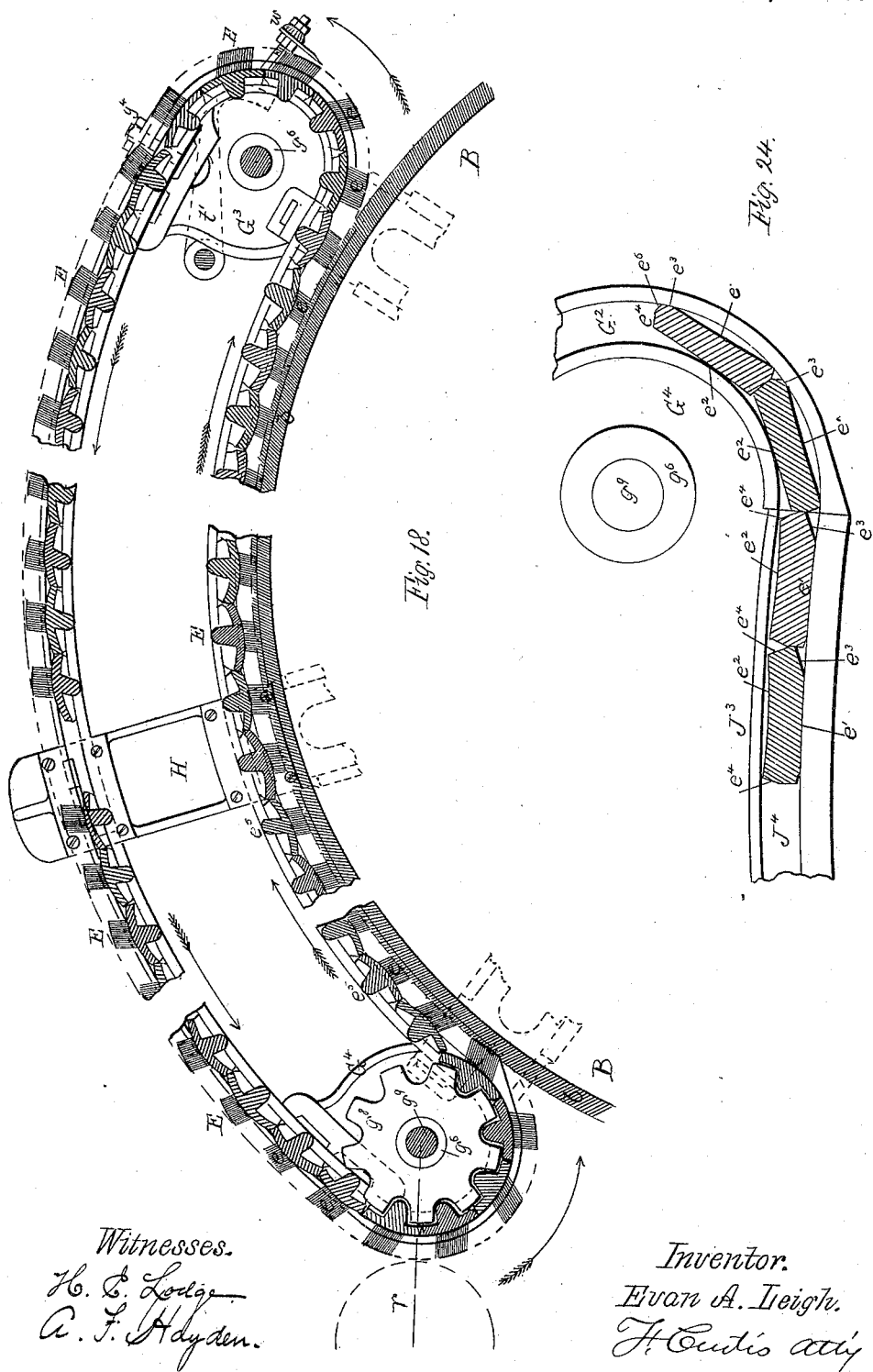
Witnesses.
H. E. Lodge
A. F. Hayden
Inventor.
Evan A. Leigh.
H. Curtis atty (No Model.)

E. A. LEIGH.
CARDING MACHINE.

No. 335,761.

8 Sheets—Sheet 7.

Patented Feb. 9, 1886.

Witnesses.
H. E. Lodge
A. F. Hayden.

Inventor.
Evan A. Leigh.
F. Curtis, atty.

(No Model.)

8 Sheets—Sheet 8.

E. A. LEIGH.
CARDING MACHINE.

No. 335,761.  Patented Feb. 9, 1886.

Witnesses.
H. E. Lodge
A. G. Mead

Inventor:
Evan A. Leigh,
H. Curtis. Atty.

UNITED STATES PATENT OFFICE.

EVAN ARTHUR LEIGH, OF MANCHESTER, COUNTY OF LANCASTER, ENGLAND.

CARDING-MACHINE.

SPECIFICATION forming part of Letters Patent No. 335,761, dated February 9, 1886.

Application filed April 10, 1884. Serial No. 127,288. (No model.) Patented in England August 13, 1878, No. 3,195.

*To all whom it may concern:*

Be it known that I, EVAN ARTHUR LEIGH, a subject of the Queen of Great Britain, residing at Manchester, in the county of Lancaster, England, have invented certain new and useful Improvements in Carding-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention may be considered as improvements in English Letters Patent No. 3,195 of 1878, and relates to machines for carding cotton and other fibrous materials.

Figure 1:
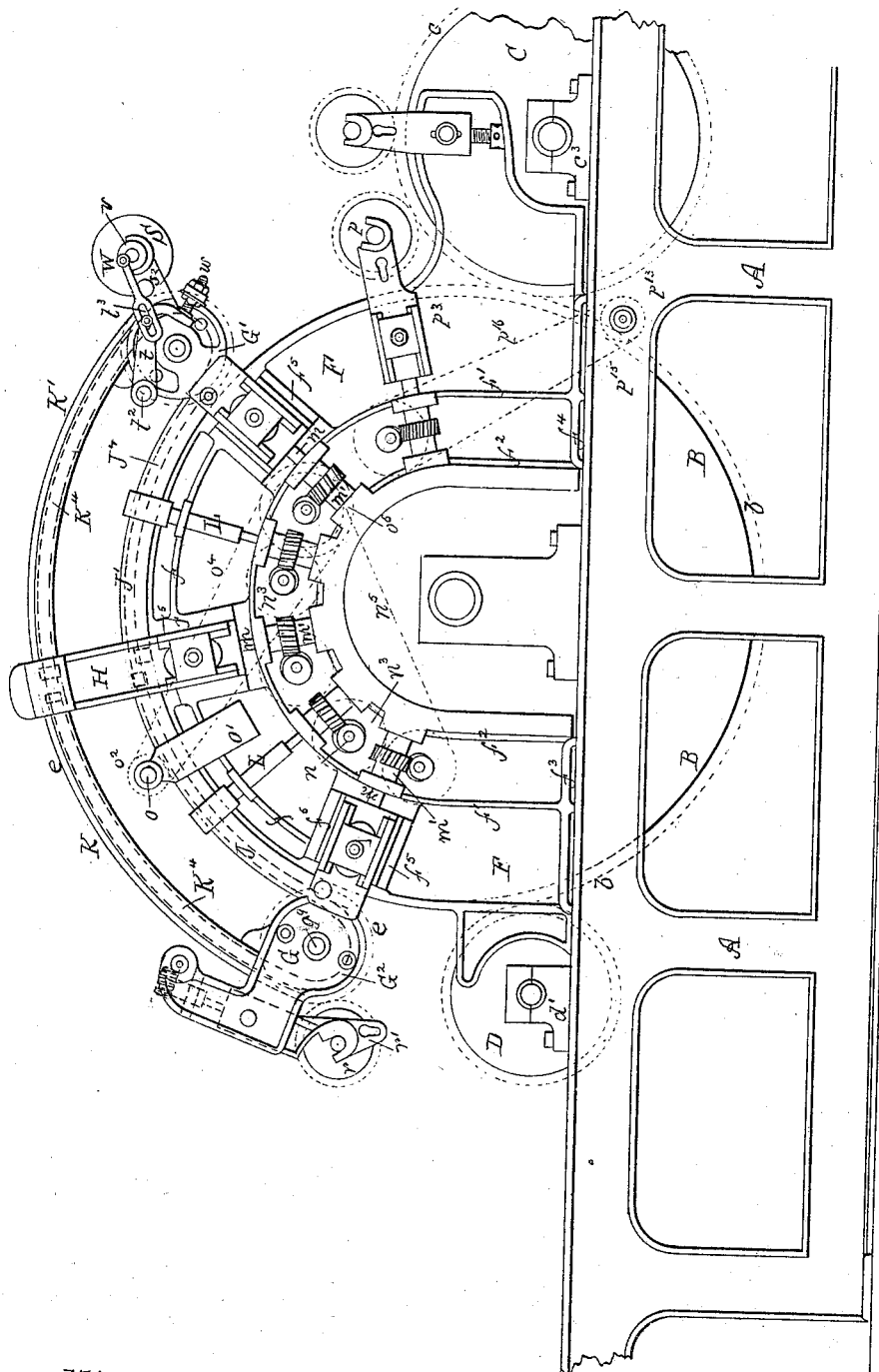
Figure 10:
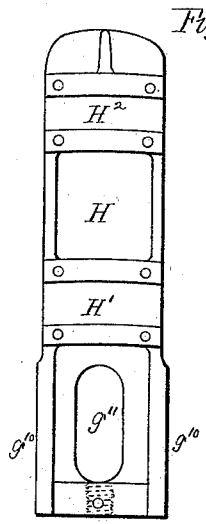
Figure 11:
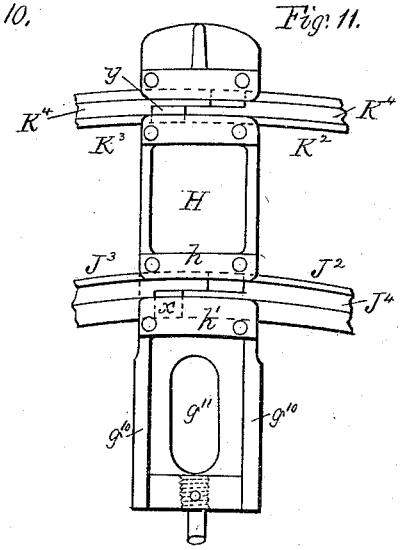
Figure 12:
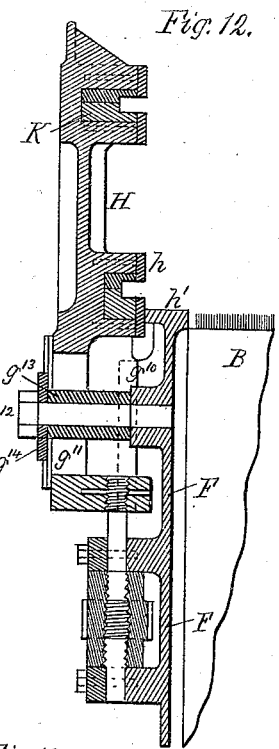
Figure 21:
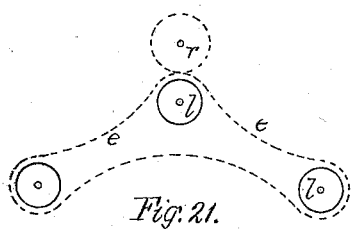
Figure 16:
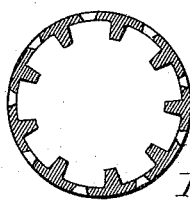
Figure 14:
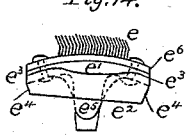
Figure 13:
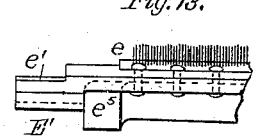
Figure 15:
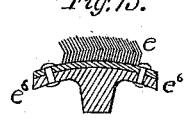
Figure 23:
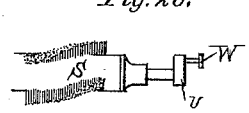
Figure 19:
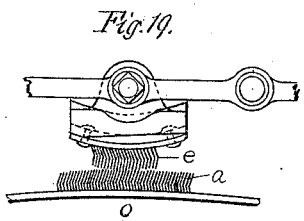
Figure 22:
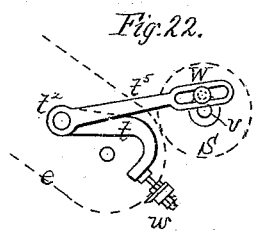
Figure 17:
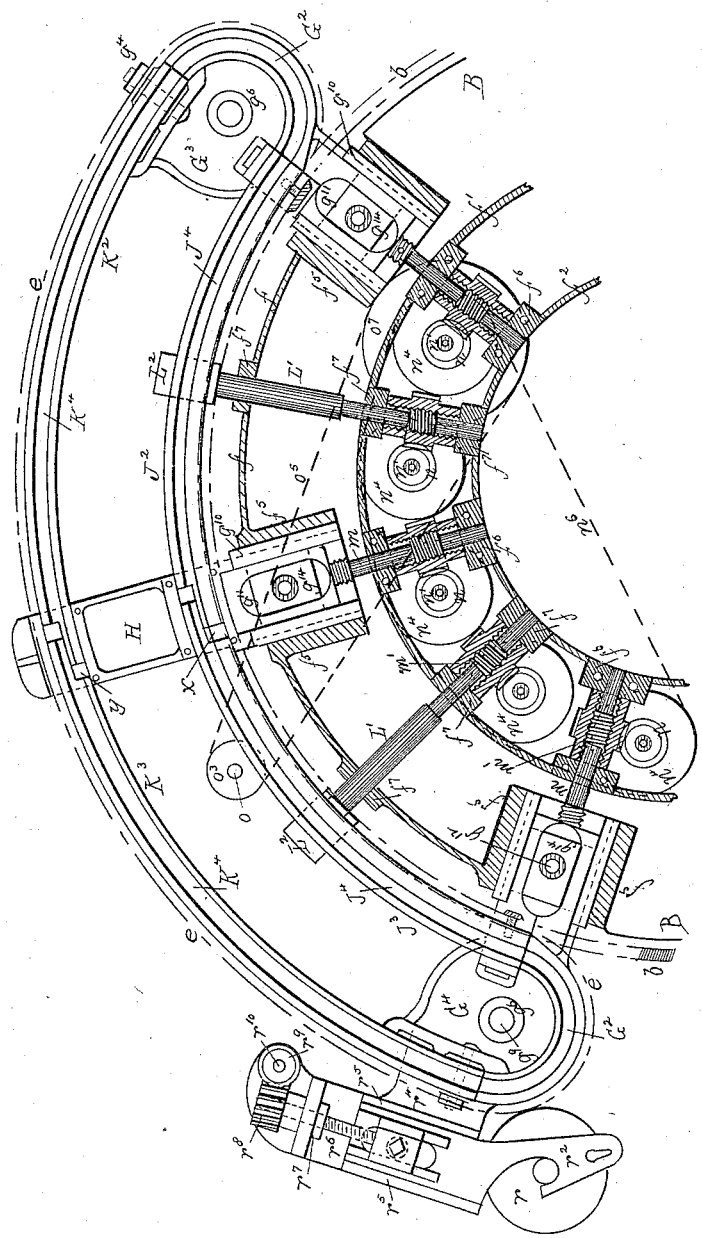
Figure 25:
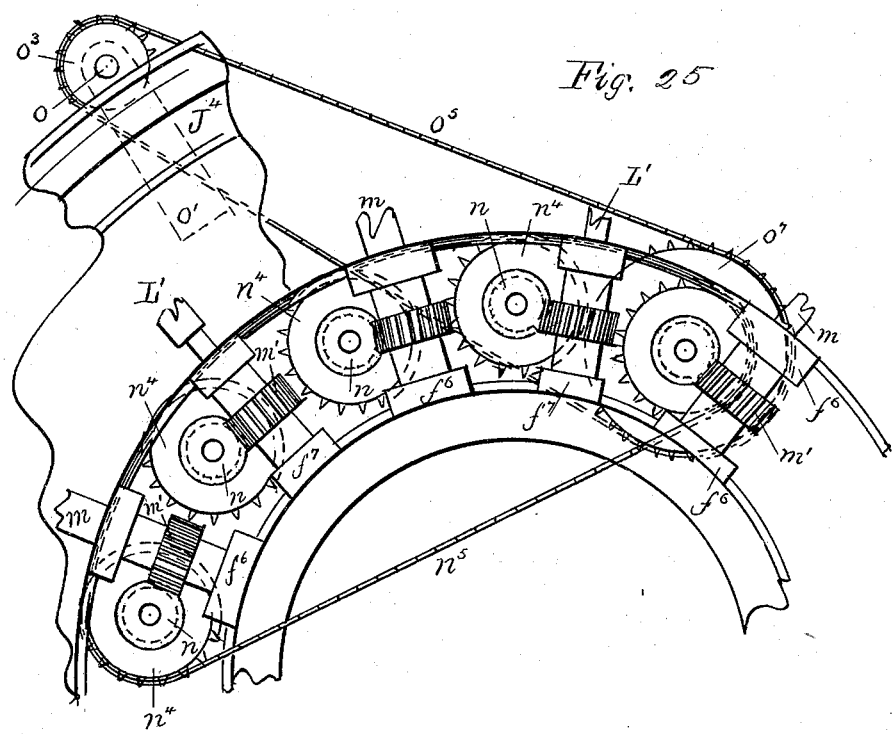
Figure 26:
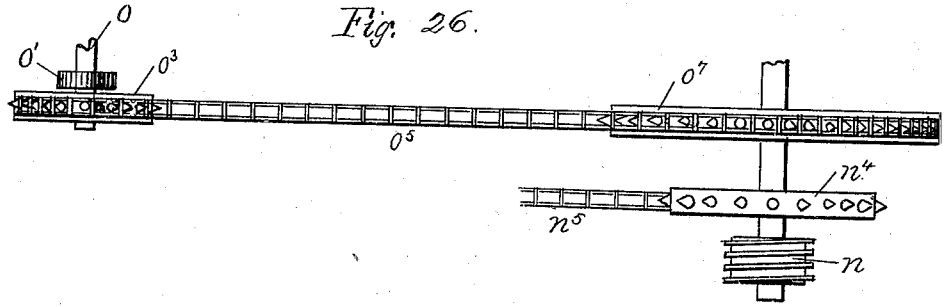
Figure 27:
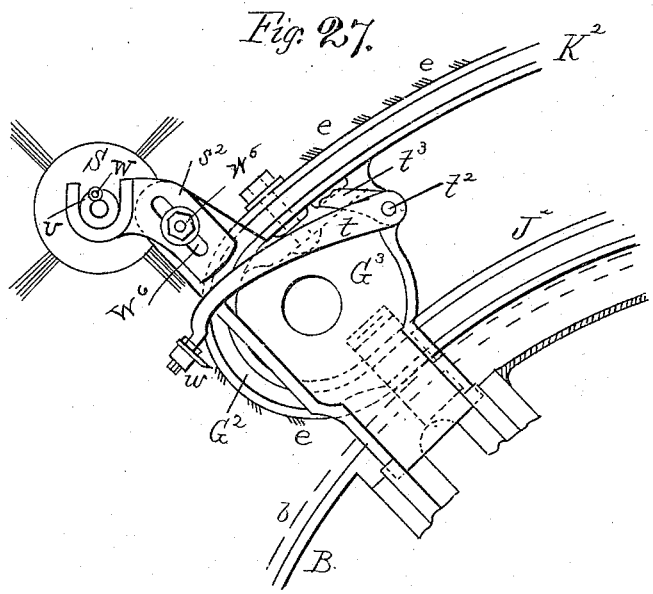

The drawings accompanying this specification represent in Figures 1 and 2 side elevations of a carding-engine containing my improvements, Fig. 1 being on the "driving side," usually so called, and Fig. 2 the opposite side. Fig. 3 is a cross-section of the flexible bend and top of a setting-pillar. Fig. 4 is a rear elevation of the flexible bend. Fig. 5 represents a detail view in side elevation of one side of the supporting-brackets. Fig. 6 represents a detail view in elevation of the opposite side of another supporting-bracket, its adjusting devices, and other proximate parts of the machine. Fig. 7 is a vertical section on line $x\ x$ of Fig. 6; Fig. 8 a front view, and Fig. 9 a section, of one of the setting-pillars, the flexible bend, and worm-gears for setting the same. Fig. 10 is a back view of the middle setting-bracket, and Fig. 11 is a similar view showing the means for supporting the flexible bends in said bracket, while Fig. 12 is a vertical section of the same. Fig. 13 is a side view, Fig. 14 an end view, and Fig. 15 a cross-section, of a top card or flat constructed according to my present invention. Fig. 16 is a section of a cylinder from which the top cards or flats, Figs. 13, 14, and 15, may conveniently be produced. Fig. 17 is an enlarged view of the inner side of the flexible bend, showing the setting pillars or standards. Fig. 18 is a section of the series of top cards or flats and carding-cylinder with new card-clothing in the position of parts, as shown in Figs. 1 and 2. Fig. 19 is an end view, and Fig. 20 a side view, of my improved card when connected by a coupling-chain. Fig. 21 is a diagram showing position of grinding-roller for top cards or flats. Figs. 22 and 23 are respectively front and side elevations of a stripping comb and brush containing one feature of my improvements; Fig. 24, cards in channel $G^2$, to be hereinafter described. Fig. 25 represents an enlarged detail side elevation of the mechanism for changing the position of the flats, and Fig. 26 represents an enlarged detail plan view of a part of said mechanism. Fig. 27 represents a detail view, enlarged, of the stripping-brush, the adjusting devices therefor, and proximate parts.

In the drawings, A A' represent the housings of the machine-frame; B, the carding-cylinder; C, the doffer; D, taker-in, and F F' the "main bends," so called, consisting of two circular annular plates, each formed with flanges $f\ f'\ f^2$, which terminate at their bottom parts in two feet, $f^3\ f^4$, by which they are secured to the top flanges of the carding-engine frame.

Upon the outside of the plate F, I mount a flexible bend, J J', and upon plate F' a similar one, $J^2\ J^3$, which are segments of a flat ring, and are parallel one to the other, and have formed upon their inner faces, parallel to their periphery, grooves $J^4\ J^4$, to support the ends of the top cards or flats as they travel above the carding-cylinder. Each flexible bend is formed in two or more parts, the ends of which overlap each other, as shown in Fig. 4, for purposes hereinafter described.

To operate the series of top cards or flats with reference to the surface of the carding-cylinder, I mount brackets G G' G³ G⁴ upon the outer face of each circular plate F F', and, further, I also mount upon said plates a center bracket, H. The outer portion of the end brackets are formed with concentric grooves $G^2$ to receive and guide the ends of the top cards or flats. These grooves may be formed by independent pieces bolted thereto. These bends J J' J² J³ K K' K² K³ and the brackets G G' G³ G⁴ constitute collectively a support or supports for the series of flats which travel after the manner of an endless belt in the guideway formed by the continuous grooves of said devices. The outer end of the flexible bend J is bolted and retained in place in the grooved block $g'$ (see Fig. 7) by the screw $g^2$, and the block itself by the bolt $g^3$. The outer ends of the bends $J'$ $J^2$ $J^3$ are secured in a similar manner. The outer ends of the flexible bends being thus secured, the grooves $G^2$, &c., in the brackets G, &c., coincide with the groove $J^4$ in the bends, and a continuous unbroken groove is thus formed. The center bracket, H, is formed with two slots or grooves, $H'$ $H^2$, Fig. 10, through which the flexible bends J $J'$ $J^2$ $J^3$ pass, and which permit of their free passage.

To secure a smooth and uniform movement to the flats over the openings in the flexible bends, I secure two plates, $h$ $h'$, to each bracket H, (see Fig. 11,) and these plates are of the same radius as the groove $J^4$ in the flexible bends. Flat segmental plates or top bends, K $K'$ $K^2$ $K^3$, of similar shape to J $J'$, &c., are disposed over the latter. These bends are elastic, formed in two parts, whose ends overlap, (see Fig. 11,) and have grooves $K^4$ formed upon their inner sides corresponding to the grooves $J^4$. The ends of these top bends are secured to the brackets G by suitable bolts, $g^4$; hence, when these bends are united and made up they form an unbroken bend with a continuous groove for the rotation of the top cards or flats. The grooves $K^4$ in plate K and groove $G^2$ in bracket G coincide, as also groove $K^4$ in plate $K'$, with groove $G^2$ in bracket $G'$, and, following the groove $G^2$ upon bracket G, it finally unites with $J^4$ in $J'$ and $J^4$ in J with groove $G^2$ in bracket G, with the grooves $H'$ $H^2$, complete the circuit for that side of the engine. (See Fig. 1.) The continuous groove upon the other side of the engine is similarly completed, in which the opposite ends of the top cards or flats slide as they travel round when in active operation. The grooves $H'$ $H^2$ are formed in order to support and pass the flats over the openings $x$ $y$, which are necessarily left in order to admit of diminution of the length of the flexible bends J $J'$, &c., K $K'$, &c., when bringing the flats nearer to the periphery of the carding-cylinder B.

Instead of constructing the top cards or flats with a flat face, as heretofore, and grinding the wire-clothing on them to the convex curve required before actively employed, I form each top card or flat with a convex surface, so that when the wire clothing is secured to them it shall assume the same convexity; hence the only preliminary grinding necessary is to reduce the face of the wire clothing to an even or level surface. In addition to this, the clothing can be attached to the top cards or flats more tightly than when the surface of the top cards was flat. Each top card or flat has formed at each end E $E'$ a curve, $e'$, of a radius equal to that of the bottom of the grooves $J^4$ of the flexible bends J $J'$, &c., when such bends are contracted to their smallest diameter required, in consequence of the wearing away of the wire clothing on both the flats and the cylinder, and the contraction of the flexible bends in setting them nearer the axis of the cylinder. The curves $e'$ $e'$ are formed on the front of the top cards, while at the rear ends of each are curves $e^2$ $e^2$. These latter are of the same radius as the bottom of the groove $K^4$ in the top bends, K $K'$, &c. The curves $e^2$ $e^2$ are oppositely disposed from the curves $e'$ $e'$. A cross-section of the ends of top cards or flats adapted to travel in the grooves $G^2$, &c., is shown in Fig. 24 as consisting, in addition to the curved surfaces before mentioned, of the curves $e^3$ $e^3$, facets on the curves $e'$ $e'$, and of the same radius as the outside of the groove $G^2$, and parallel to the convex face of the top card or flat, whose sides are shown at $e^4$ $e^4$ in lines radiating to the center of the curves $e^3$ $e^3$. The ends E $E'$ of said cards are further provided with a tooth, $e^5$ $e^5$, Figs. 13 and 14. In traveling about the grooves $G^2$ (see Fig. 24) the curves $e^3$ $e^3$ are in contact with the outside of the grooves $G^2$, while the inside of the said grooves are in contact with the center of the curves $e^2$ $e^2$. The curves $e^2$ $e^2$ are in contact with the bottom of the groove $K^4$, and the junction of the curves $e'$ $e'$ and $e^3$ $e^3$ are in contact with the top portion of groove $K^4$ when said flats are traveling therein.

To revolve and maintain the top cards or flats in active operation, I have formed upon the inner side of each bracket G $G'$ $G^3$ $G^4$ a circular hub, $h^6$. A horizontal shaft, $g^9$, spans the engine above the taker-in D and has its bearing in the hubs $g^6$ $g^6$ in G $G^4$, and this shaft has two sprocket-wheels, $g^7$ $g^8$, disposed one at each end. The teeth of these wheels are arranged in parallelism upon the axis of the shaft $g^9$—that is, the teeth within the wheels $g^7$ and $g^8$ are opposite. These latter gear into the teeth $e^5$ $e^5$ on the ends of the top cards or flats, and when the wheels $g^7$ $g^8$ are rotated the flats are caused to travel after the manner of an endless belt above the carding-cylinder.

That part of my invention which relates to the top cards or flats is applicable to the metal top cards or flats of other carding-engines when the wire of such top cards is ground with a curved face.

Figure 20:
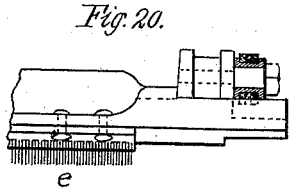

Figs. 19 and 20 represent my improved top card or flat as applied to a carding-engine when said cards are connected by a coupling-chain.

In order to construct the curved plates of the top cards as herein shown, I form a cylinder, Fig. 16, of a diameter required to make nine cards or flats; but the number may be varied. After the cylinder has been turned on its surface it is cut longitudinally and divided into the required number of flats. Provided a flat with a less degree of curvature is required, a larger cylinder is provided from which they are to be cut.

The brackets G, $G'$, $G^3$, and $G^4$ (see Fig. 6) are provided at their lower ends with radial extensions provided with lips or guides, $g^{10}$ $g^{10}$, which move in corresponding slots, $f^5$ $f^5$, &c., formed upon the flanges $f$ $f'$, attached to the circular plates F $F'$, and permit of free movement of said brackets nearer to or farther from the axis of the carding-cylinder, as occasion requires. To retain said brackets within their guides $f^5 f^5$, &c., I form a slot, $g^{11}$, in the foot of such bracket. Through this opening I pass a bolt, $g^{12}$, which extends through the plates F F' and bushing $g^{13}$, and is secured tightly in place by a nut; hence the surfaces $g^{15} g^{15}$, Fig. 6, on each side of the opening $g^{11}$ are parallel to the slides $g^{10} g^{10}$, and the inner sides of the plates $g^{14}$ are in contact with the faces $g^{15} g^{15}$, and permit of movement of the brackets toward or away from the axis of the carding-cylinder, between the plates $g^{14} g^{14}$ and the guides $f^5 f^5$, the bushing $g^{13}$ sustaining the pressure caused by the screwing up of the nuts on the bolts $g^{12}$ against the plate $g^{14}$. The center setting-brackets, H H, are similarly disposed and arranged.

To provide for a proper adjustment of the above movable center and end setting-brackets, I have securely attached to the bottoms of the brackets G, G', $G^3$, $G^4$, H, and H cylindrical pillars or standards $m$ $m$, &c., (shown as being screwed in and pinned,) to prevent movement in their respective brackets. These pillars or standards are uniform in diameter, and have their lower ends peripherally screw-threaded. Nuts $m'$ $m'$ inclose each of these screw-threads, while a worm-gear is formed upon the periphery of each nut, and end play of the latter is prevented by being inclosed between the bosses $f^6 f^6$ on the plates F F'.

To secure the circular pillars with their nuts and worm-gears to the brackets and confine them in their bearings in the bosses $f^6 f^6$, &c., I dispose removable caps $m^2$.

Located between the brackets G, G', $G^3$, $G^4$, H, and H, I dispose four radial setting pillars or standards, L L L' L', these pillars being cylindrical in shape and provided with a groove, $L^2$, which embraces the flexible bends J J', &c. These pillars pass through three guides or bosses, $f^3 f^3$, and are similarly arranged and provided with screw-threads and worm-gears as the setting pillars $m$.

It is evident from the construction above shown that the rotation of the worm-gears $m'$ $m'$ will cause the pillars L L' $m$ $m$, &c., with their brackets to move toward or away from the axis of the carding-cylinder, and, as the screw-threads are the same on all the pillars, they will slide in the same manner and to the same extent if the nuts and worm-gears which inclose them are rotated the same way and to the same extent. Each nut and worm-gear is rotated, when desired, by means of a worm, $n$, which engages the worm-gears $m'$, formed on the nuts. Each worm $n$ is firmly attached to chain-wheels $n^3$ $n^4$, &c., which engage and are driven by chains or belts $n^5$ $n^6$, respectively, on each side of the engine.

The operation upon one side of the engine is as follows: The chain-wheels $n^3$ $n^3$, &c., being actuated by the chain $n^5$, the worm $n$, &c., integral with said wheels, will revolve simultaneously, also causing the nuts and worm-gears $m'$, &c., to revolve, and with them the setting-brackets G H G' and setting-pillars L L, which are all simultaneously advanced to the same extent nearer to or farther from the axis of the carding-cylinder in radial lines thereof; hence the flexible bends J J' K K' are advanced or withdrawn at each end by the end brackets, G G', and the center bracket, H, and with them the top cards or flats which travel in said bends.

To move or set the flexible bends J J' K K', &c., simultaneously, I have disposed a shaft, $o$, in brackets $o'$ $o'$, one on each side of the engine, and upon the ends of the said shaft I mount pulleys or chain-wheels $o^2$ $o^3$, which drive the chain-wheels $o^6$ and $o^7$, respectively. The latter are set upon the same shafts with their chain-wheels $n^3$ and $n^4$. The shaft $o$ is squared at the end to receive a setting key or wrench, and upon this shaft being rotated the chain-wheels $n^3$ $n^4$, &c., will be simultaneously rotated and to the same extent by and through the chain-wheels $o^6$ $o^7$ $o^2$ $o^3$, as described.

In practice I prefer that by rotation of the shaft $o$ to the right, Fig. 1, the brackets and connecting parts shall be moved toward the axis of the carding-cylinder, while a movement of the same to the left will remove them from the axis. The shaft $g^9$, to effect movement of the sprocket-wheels and the flats or top cards, is rotated in the usual manner by a worm-gear attached to the end of said shaft and driven in the usual manner.

Rollers $p$ and $r$ are used for grinding the wire clothing $b$ and $e$ of carding-cylinder B and flats E', respectively. The former roller is adjusted by means of worm $p^8$, shaft $p^{13}$, wheel $p^{15}$, and chain $p^{17}$, and it is mounted in standards $p^2$ $p^3$. The roller $r$ is mounted in standards $r'$ $r^2$, movable in guides $r^5$ $r^5$ of brackets $r^3 r^4$. This roller $r$ is adjusted by means of screw-threaded shafts $r^6$, fixed collars $r^7$, worm-gears $r^8$, worms $r^9$, and a shaft, $r^{10}$.

The doffer and taker-in boxes or bearings $c^3$ $c^3$ and $d'$ $d'$, respectively, are arranged and adjusted in the usual manner.

To effect the peculiar manner of driving the stripping-combs $w$ for the top cards or flats, I adopt the following system: I attach the comb $w$ adjustably to twin levers $t$ $t'$, Fig. 22, which are attached to a horizontal rock-shaft, $t^2$, which spans the carding-cylinder, and is journaled in the brackets G' $G^3$. To each end of the rock-shaft $t^2$ are attached the levers $t$ $t'$, which have at their free ends screws, which pass through each end of the comb $w$ and afford means of support. Check-nuts are disposed upon each side of the comb, moving on the screws before named, by which the comb is brought nearer to or removed from the top cards or flats. Upon the outside of the lever $t$, Fig. 1, and midway between the rock-shaft $t^2$ and comb $w$, I have disposed a stud, to which is secured a slotted link, $t^3$, by means of a nut. One end of the link $t^3$ is pivoted to the wrist-pin W of a crank, $v$, which is secured to one journal of the top cards or flats stripping-brush S. This stripping-brush is suitably journaled in stands $s'$ $s^2$, which are adjustable with reference to the brackets $G'$ $G^3$, to which they are attached. As the brush S revolves, the crank $v$, which is secured to one end of the top card or flat stripping-brush journal, causes the slotted link $t^3$ to oscillate the lever $t$, while the latter, being secured to the rock-shaft $t^2$, causes the latter to rock and with it the lever $t'$, secured thereto, and the comb oscillates in parallelism with the top cards or flats.

When it is required to set the stripping-brush S nearer to or farther from the top cards or flats, first loosen the bolts $W^5$, which hold the stands $s'$ $s^2$ securely to the brackets $G'$ $G^3$. The stands are now free to move by means of the slots $W^6$ formed in them. Adjust the brush to suit the circumstances, and when the alteration is effected turn up the nuts, and the operation is completed. It will be evident that at each adjustment of the brush the distance between the journal thereof and the pivot $t^2$ is altered, either increased or diminished. For this purpose the link $t^3$ is slotted where it is connected with the crank $v$ by the wrist-pin W, and the latter adjusted in either direction by first loosening the fastening device. This would be the adjustment in case the mechanism is employed as shown in Fig. 22; but otherwise the stud actuating the link $t^3$ is adjusted in said slot, as heretofore premised.

In Fig. 22 I have shown another form of mechanism for oscillating the top card or flat stripping-comb $w$. In this the same rock-shaft, comb, and levers $t$ $t'$ are employed, but the rock-shaft $t^2$ is caused to rock by means of a lever, $t^5$, secured to the same end of the shaft $t^2$ as the lever $t$. The lever $t^5$ is slotted at its free end and straddles the wrist-pin W of the crank $v$. Upon rotation of the brush S the crank $v$ causes the lever $t^5$ to oscillate, and transmits that movement to the rock-shaft $t^2$, levers $t$ $t'$, and comb $w$, as in the former manner shown.

I claim—

1. The flexible elastic bearing-bends J J' K K' with their grooves, end and center adjusting-brackets, G, G', and H, with their grooves, in combination with the adjusting rods or pillars L L' and their grooves, and main bends F F', substantially as and for the purposes set forth.

2. The end brackets, G G', &c., provided with grooves $G^2$ $G^2$, in combination with the main bends F F', the intermediate connecting devices, the supporting-bends J J' K K', the carding-cylinder, the top-flats, and means for causing the latter to return in the guideway formed by said grooves, substantially as set forth.

3. A series of flats, E E', having a convex face and arranged in the form of an endless belt, in combination with grooved bends and brackets, forming guideways, in which they travel, the carding-cylinder, supports for said cylinder and guideways, and means for causing their continuous motion above the carding-cylinder, substantially as set forth.

4. The stripping-brush and its axle having a crank, as stated, and means, as described, for adjusting said stripping-brush, in combination with the slotted link $t^3$, lever $t$, rock-shaft $t^2$, and the stripping-comb oscillated by said link, substantially as set forth.

In testimony whereof I affix my signature in presence of two witnesses.

EVAN ARTHUR LEIGH.

Witnesses:
ARTHUR C. HALL,
GEORGE ALLEN HALL,
9 *Mount Street, Manchester.*